United States Patent Office 3,737,461
Patented June 5, 1973

3,737,461
POLYMERIC TERTIARY BUTYL AMINE VULCANIZING AGENTS AND METHOD OF PREPARATION
Kyung S. Shim, Irvington, N.Y., assignor to Stauffer Chemical Company, New York, N.Y.
No Drawing. Continuation-in-part of application Ser. No. 839,615, July 7, 1969, which is a continuation-in-part of application Ser. No. 831,722, June 9, 1969, both now abandoned. This application June 16, 1971, Ser. No. 153,833
Int. Cl. C07c 83/00; C08f 27/06
U.S. Cl. 260—583 EE                 1 Claim

ABSTRACT OF THE DISCLOSURE

A poly(tertiary butylamine) sulfide composition useful as a vulcanizing agent for synthetic and natural rubbers, the repeating structural unit of this composition having the following formula:

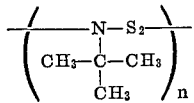

wherein $n$ can range between 3 and 100, and the process of manufacturing the same.

CROSS-REFERENCE TO RELATED APPLICATION

This application is a continuation-in-part of my copending application, Ser. No. 839,615, filed July 7, 1969 now abandoned, which is, in turn, a continuation-in-part of application Ser. No. 831,722 filed June 9, 1969, now abandoned.

BACKGROUND OF THE INVENTION

In the art of vulcanizing rubber compositions, it is the practice to admix the particular rubber material with additive compounds such as process oils, organic acids and zinc oxide. These rubber materials can be selected from any number of compositions useful in a vulcanizing process such as natural rubber or synthetic unsaturated rubbers. The synthetic unsaturated rubbers can be described as alpha-olefin hydrocarbons which include ethylene propylene/diene terpolymers, ethylene/1-butene/diene terpolymers, styrene/butadiene copolymers, cis-polybutadiene polymers, isoprene polymers and butadiene/acrylonitrile copolymers. After these materials are thoroughly mixed together, a vulcanizing agent is added thereto and the resulting combination of ingredients is then heated in a conventional apparatus and thereby vulcanized into useful products.

The most commonly used vulcanizing agent for such formulations is free sulfur. However, its use often leads to premature vulcanization, i.e. scorch, during its mixing with the rubber and with other ingredients. Moreover, "blooming" is encountered, whereby crystals of sulfur form on the surface of the uncured rubber, preventing the desired mutual adhesion of rubber sheets such, for example, as tire plies. In order to overcome these problems, amino compositions containing a substantial amount of sulfur have been formulated and used in lieu of free sulfur. However, these materials have not been notably successful because the resulting rubber formulations are often too scorchy, have a high reversion, a low curing rate and poor blooming properties.

The art of manufacturing N,N-polythio dialkyl amines is an old and well known procedure as described, for example, in U.S. Patents Nos. 1,719,920, 2,284,578 and 2,779,761. This process entails the reaction of a secondary alkyl amine with sulfur monochloride or sulfur dichloride so as to yield a symmetrical composition which is reported to be useful as a curing agent for rubbers. However, polymeric amine sulfides cannot be manufactured by this process since it is not able to yield products in which the repeating structural units contain nitrogen-to-sulfur bonds. Thus, by employing the process of the prior art, the repeating structural unit of the resulting compound will contain several sulfur atoms between at least two nitrogen atoms. Moreover, attempts to manufacture polyamine sulfides have not been successful due in part to the relative unstability of the end products. However, a procedure which has been successful in preparing these polyamine sulfides is described in the above described copending application Ser. No. 839,615.

By means of this procedure, polyamine sulfides can be manufactured by reacting a primary amine with a sulfur chloride under carefully controlled conditions so as to yield polymeric compositions whose repeating structural units have the formula:

  (I)

wherein R is an alkyl group containing from about 3 to 10 carbon atoms which can be straight chained, branched or cyclic in nature, wherein $x$ can be between 1 and 5 and $n$ can range between 2 and 100.

TECHNICAL DISCLOSURE OF THE INVENTION

Since the filing of the above described copending application Ser. No. 839,615, it has been found that the poly(tertiary butylamine) sulfide compositions whose repeating structural units have the formula:

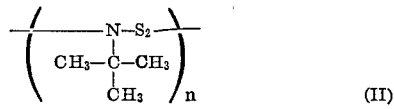  (II)

wherein $n$ can range between 3 and 100 are far superior, as vulcanizing agents, to the other members of the broad class of polyamine sulfides encompassed within the scope of the above given generic formula, i.e. Formula I. Thus, this tertiary butylamine derivative has been found to be far superior, for example, to the n-butyl, isopropyl, ethyl, methyl, n-propyl and cyclohexyl amine derivatives with respect to the improved scorch delay, accelerated cure and low reversions which it achieves upon being used as a vulcanizing agent for natural and synthetic rubbers.

More particularly, this poly(tertiary butylamine) sulfide provides longer scorch delay periods thereby providing the practitioner with a longer period during which he may safely work the rubber composition undergoing curing prior to the onset of cross-linking. The attainment of an accelerated cure with this novel polymeric derivative of this invention is also significant in that a faster cure permits a greater volume of rubber to be vulcanized within a given period of time. And, the low degree of reversion, i.e. breakdown of crosslinking, exhibited by the rubber compositions vulcanized with the novel curing agent of this invention is indicative of the excellent heat aging characteristics of these compositions.

In preparing this novel vulcanizing agent, tertiary butylamine is dissolved within an organic solvent such as hexane, octane, petroleum ether, pentane, heptane, ether, or like organic solvents. The amine and organic solvent are then cooled to a temperature in the range of from about 0 to about 50° C. Aqueous alkali hydroxide is then added thereto to form a two-layer system consisting of an aqueous lower layer and an organic upper layer. The alkali metal hydroxide can be selected from the group consisting of sodium hydroxide and potassium hydroxide. Sulfur monochloride, i.e. $S_2Cl_2$, is then added dropwise to the organic layer to form the desired end product. After the mechanism for the reaction is believed to involve a sequence whereby, upon adding the sulfur monochloride to the amine or organic layer, an amine salt, i.e. an amine hydrochloride will form and will precipitate into the aqueous layer. The amine hydrochloride will then react with the alkali in the aqueous layer to free the amine which will then react with the sulfur monochloride within the organic layer to form the desired end product. After the product has been formed, the aqueous layer is simply separated from the organic layer with the end product being washed and purified.

The resulting poly(tertiary butylamine) sulfide polymeric composition can then be used in vulcanizing various rubber compositions. Thus, it can be intermixed with either natural rubbers or with unsaturated synthetic rubbers in an amount ranging between 0.5 to about 10 parts per 100 parts of the rubber composition. Typical synthetic rubbers include ethylene/propylene/diene terpolymers, ethylene/1-butene/diene terpolymers, styrene/butadiene copolymers, cis-polybutadiene polymers, isoprene polymers, butadiene/acrylonitrile copolymers and the like. After the vulcanizing agent has been added thereto along with other commonly utilized adjuvants such as accelerators, zinc oxide and aliphatic, e.g. stearic, acids, the rubber composition is fully cured in a conventional manner.

The following examples will further illustrate the embodiment of this invention. In these examples, all parts given are by weight unless otherwise noted.

Example 1

This example illustrates the preparation of the novel poly(tertiary butylamine) sulfide curing agent of this invention.

In a three-neck round bottom flask equipped with a mechanical stirrer, thermometer and dropping funnel were placed 700 grams of hexane, 327 grams of tertiary butylamine, 2 liters of water and 180 grams of sodium hydroxide. The solution was cooled in an ice-bath to 27° C. As the solution was stirred vigorously, 610 grams of sulfur monochloride dissolved in 200 milliliters of hexane were added, dropwise, over a period of 1.5 hours while keeping the reaction temperature below 27° C. Upon completion of the addition of sulfur monochloride, the mixture was stirred for two hours in order to complete the reaction whereupon the hexane layer was separated from the colorless aqueous layer and dried over magnesium sulfide. The solvent was then removed on a rotary evaporator to give 525 grams of a yellowish oil having an average molecular weight of 316.

Example 2

This example describes the use of the poly(tertiary butylamine) sulfide of this invention, as prepared by the process of Example 1, as a curing agent for natural rubber. A master batch was first prepared by mixing 40 parts of carbon black, 4 parts of zinc oxide, 2 parts of stearic acid, 1 part of an antioxidant, and 1 part of benzothiazole disulfide with 100 parts of natural rubber. Portions of this master batch were then used to prepare two different stocks. Thus, 2.5 parts of free sulfur were added to the first stock and 2.75 parts of the curing agent of Example 1 was added to the second stock. The curing characteristics of the thus prepared stocks were then evaluated with a rotating disc viscometer as well as with an oscillating disc rheograph. The results of these evaluations are set forth in the following table.

TABLE 1

|  | 1st stock | 2d stock |
| --- | --- | --- |
| Rotating disc viscometer; small rotor,° F | 250 |  |
| Minutes to 5 point rise | 23 | 23 |
| Small rotor,° C | 270 |  |
| Minutes to 5 point rise | 12 | 13 |
| Oscillating disc rheograph; 320° F, 900 c.p.m.: |  |  |
| Minimum viscosity (in.-lbs.) | 19 | 17 |
| Maximum viscosity (in.-lbs.) | 62 | 66 |
| Scorch time (minutes to a 1 in.-lb. viscosity increase) | 3.4 | 4.3 |
| Cure time (minutes to 90% of max. viscosity) | 6.1 | 9.6 |
| Reversion time (minutes to a 2 in.-lb. viscosity decrease) | 13 | 98 |
| Cure rate (in.-lbs./minute) | 14 | 8 |
| Reversion rate (in.-lbs./minute) | 0.14 | 0.03 |

The above data clearly reveal the improved results obtained by the use of the novel curing agent of this invention as compared with the results obtained with sulfur.

Example 3

This example describes the use of the novel poly(tertiary butylamine) sulfide of this invention, as prepared by the process of Example 1, as a curing agent for a commercial styrene/butadiene rubber composition. Thus, 40 parts of carbon black, 16 parts of a naphthenic process oil, 4 parts of zinc oxide, 2 parts of stearic acid, 1 part of an antioxidant and 1.5 parts of mercaptobenzothiazole were blended with 100 parts of styrene/butadiene rubber. Portions of this master batch were then used to prepare two different stocks. Two parts of free sulfur were added to the first stock and 3.5 parts of the curing agent of Example 1 were added to the second stock. The curing characteristics of thus prepared stocks were then evaluated with a rotating disc viscometer as well as with an oscillating disc rheograph. The results of these evaluations are presented in the following table.

TABLE II

|  | 1st stock | 2d stock |
| --- | --- | --- |
| Rotating disc viscometer; small rotor,° F | 250 |  |
| Minutes to 5 point rise | 36 | 18 |
| Small rotor,° F | 270 |  |
| Minutes to 5 point rise | 19 | 11 |
| Oscillating disc rheograph; 320° F., 900 c.p.m.: |  |  |
| Minimum viscosity (in.-lbs.) | 20 | 19 |
| Maximum viscosity (in.-lbs.) | 69 | 71 |
| Scorch time (minutes to a 1 in.-lb. viscosity increase) | 4.3 | 3.9 |
| Cure time (minutes to 90% of max. viscosity) | 14 | 14 |
| Cure rate (in.-lbs./minute) | 4.4 | 4.7 |

Example 4

This example demonstrates the superiority, as a vulcanizing agent, of the poly(tertiary butylamine) sulfide of this invention when compared under identical conditions with a number of homologous polyamine sulfides.

The various polyamine sulfide vulcanizing agents which were compared are:

No. 1.—The poly(tertiary butylamine) sulfide of this invention whose preparation is described in Example 1.

No. 2.—A poly(cyclohexylamine) sulfide prepared by means of the same procedure as described in Example 1 but with cyclohexylamine being used in place of tertiary butylamine.

No. 3.—A poly(methylamine) sulfide prepared by means of the same procedure as described in Example 1 but with methylamine being used in place of tertiary butylamine.

No. 4.—A poly(ethylamine) sulfide prepared by means of the same procedure as described in Example 1 but with ethylamine being used in place of tertiary butylamine.

No. 5.—A poly(n-propylamine) sulfide prepared by means of the same procedure as described in Example 1 but with n-propylamine being used in place of tertiary butylamine.

No. 6.—A poly(isopropylamine) sulfide prepared by means of the same procedure as described in Example 1 but with isopropylamine being used in place of tertiary butylamine.

No. 7.—A poly(n-butylamine) sulfide prepared by means of the same procedure described in Example 1 but with n-butylamine being used in place of tertiary butylamine.

A natural rubber masterbatch was prepared by milling the following ingredients for 5-6 minutes on a Banbury mixer in which the final temperature of the masterbatch was 280–300° F.

| | Parts |
|---|---|
| Natural Rubber No. 1 pale crepe | 100 |
| Carbon black | 40 |
| Zinc oxide | 4 |
| Stearic acid | 2 |
| A mixture of p-phenylene diamines (antioxidant) | 1 |

The resulting masterbatch was allowed to recover for over 24 hours whereupon it was used to prepare a number of different stocks which contained the below described vulcanizing systems whose ingredients are listed in a concentration based upon 100 parts of the natural rubber in the masterbatch. In preparing each of these stocks, 0.65 part of the n-cyclohexylbenzothiazole sulfenamide accelerator were first thoroughly blended with 147 parts of the masterbatch, the blending being accomplished on a 2-roll laboratory mill. After about 10 minutes of blending, the vulcanizing agent was introduced and thoroughly blended into the mixture. The following table describes the composition of each of the thus prepared stocks.

| | Stock | | | | | | |
|---|---|---|---|---|---|---|---|
| | A | B | C | D | E | F | G |
| Natural rubber master batch | 147 | 147 | 147 | 147 | 147 | 147 | 147 |
| N-cyclohexylbenzothiazole sulfenamide | 0.65 | 0.65 | 0.65 | 0.65 | 0.65 | 0.65 | 0.65 |
| Vulcanizing Agent No.: | | | | | | | |
| 1 | 3.0 | | | | | | |
| 2 | | 5.0 | | | | | |
| 3 | | | 2.5 | | | | |
| 4 | | | | 4.0 | | | |
| 5 | | | | | 4.0 | | |
| 6 | | | | | | 3.0 | |
| 7 | | | | | | | 5.0 |

The curing characteristics of each of the above described stocks were then determined on an oscillating disc rheograph. This apparatus comprises a type of viscometer which was operating at 900 cycles per minute at a temperature of 320° F. with its disc oscillating over a ±3° arc. The results of this evaluation are summarized in the following table:

| | Stock | | | | | | |
|---|---|---|---|---|---|---|---|
| | A | B | C | D | E | F | G |
| Viscosity (in.-lbs.), minimum (before cure) | 18.2 | 25.7 | 22.8 | 24.9 | 27.1 | 19.9 | 24.9 |
| Viscosity, maximum (after cure) | 64.0 | 60.8 | 68.4 | 52.0 | 63.7 | 71.7 | 57.8 |
| Scorch time a (minutes) | 4.5 | 1.5 | 2.6 | 1.4 | 1.0 | 3.5 | 2.1 |
| Cure time b (minutes) | 9.7 | 5.6 | 7.1 | 4.5 | 4.0 | 6.6 | 7.8 |
| Cure rate c (in.-lbs./min.) | 7.7 | 7.5 | 8.9 | 7.5 | 10.6 | 14.5 | 5.0 |
| Reversion time d (min.) | 41.5 | 28.0 | 15.5 | 14.5 | 14.5 | 27.3 | 19.0 |
| Reversion rate e (in.-lbs./min.) | 0.10 | 0.13 | 0.46 | 0.31 | 0.22 | 0.16 | 0.31 | a Scorch time=Time required to obtain a 1 in.-lb. viscosity increase.
b Cure time=Time elapsed from beginning of cure until 90% of cure is attained.
c Cure rate = $\dfrac{\text{Visc. at 90\% of cure} - \text{Visc. at Scorch time}}{\text{Time to reach 90\% of cure} - \text{Scorch time}}$
d Reversion time=Time required to reach a 2 in.-lb. decrease in viscosity after attaining maximum viscosity.
e Reversion rate = $\dfrac{\text{2 in.-lb.}}{\text{Reversion time} - \text{time to attain maximum reversion}}$ The data in the above table clearly illustrate that:

(1) Stock A, which contains the novel poly(tertiary butylamine) sulfide curing agent of this invention, provides a scorch time or scorch delay period which is at least one minute longer than that attained with any of the homologous compounds with which it was compared.

(2) Although the cure rate attained with the novel compound of this invention in Stock A was exceeded by vulcanizing agents Nos. 3, 5 and 6, as used in Stocks C, E and F respectively, it must still be considered to be a far superior vulcanizing agent than any of the latter three compounds since its scorch time was so clearly superior. Thus, a vulcanizing agent having a high cure rate cannot, of course, be commercially acceptable if its scorch time is too rapid to permit the rubber stock in which it is present to be safely worked prior to the onset of cross-linking.

(3) The reversion time of Stock A containing the novel curing agent of this invention was at least 13.5 minutes longer than that displayed by the stocks containing any of the homologous compounds with which it was compared. Similarly, the reversion rate of Stock A was lower than that of any of the six other stocks with which it was compared. The superior heat stability of the stocks cured with the novel vulcanizing agent of this invention is thereby demonstrated.

These results are, therefore, fully indicative of a truly surprising degree of superiority, as a vulcanizing agent, on the part of the novel poly(tertiary butylamine) sulfide of this invention when compared, under identical conditions, with a number of homologous compounds. It is believed that these excellent results may be brought about by the fact that the novel curing agent of this invention contains tertiary alkyl substituent groups and that other poly(alkylamine) sulfides wherein the alkyl groups are tertiary alkyl groups may provide comparable results as vulcanizing agents for natural and synthetic rubbers. Thus, these tertiary alkyl substituents are believed to sterically hinder the reactivity of these curing agents thereby extending their scorch delay periods.

Variations may be made in proportions, procedures and materials without departing from the scope of this invention as defined in the following claim.

What is claimed is:

1. A poly(tertiary butylamine) sulfide whose repeating structural unit has the formula:

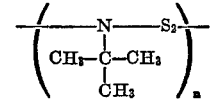

wherein $n$ can range between 3 and 100.

References Cited
UNITED STATES PATENTS

| | | | |
|---|---|---|---|
| 2,649,470 | 8/1953 | Harman | 260—464 |
| 3,040,098 | 6/1962 | Stone | 260—583 EB |
| 3,595,919 | 7/1971 | Shim | 260—583 EB |

JOSEPH L. SCHOFER, Primary Examiner

C. A. HENDERSON, Jr., Assistant Examiner

U.S. Cl. X.R.

260—79, 79.5 B